(12) United States Patent
Canim et al.

(10) Patent No.: US 11,989,261 B2
(45) Date of Patent: May 21, 2024

(54) ANSWERING QUESTIONS WITH ARTIFICIAL INTELLIGENCE USING TABULAR DATA

(71) Applicant: International Business Machines Corporation, Armonk, NY (US)

(72) Inventors: Mustafa Canim, San Jose, CA (US); Michael Robert Glass, Bayonne, NJ (US); Alfio Massimiliano Gliozzo, Brooklyn, NY (US); Nicolas Rodolfo Fauceglia, Brooklyn, NY (US)

(73) Assignee: International Business Machines Corporation, Armonk, NY (US)

( * ) Notice: Subject to any disclaimer, the term of this patent is extended or adjusted under 35 U.S.C. 154(b) by 778 days.

(21) Appl. No.: 17/039,379

(22) Filed: Sep. 30, 2020

(65) Prior Publication Data

US 2022/0101052 A1 Mar. 31, 2022

(51) Int. Cl.
*G06K 9/62* (2022.01)
*G06F 16/22* (2019.01)
(Continued)

(52) U.S. Cl.
CPC ........ *G06F 18/2148* (2023.01); *G06F 16/221* (2019.01); *G06F 16/2282* (2019.01); *G06F 16/2455* (2019.01); *G06F 16/248* (2019.01); *G06F 17/18* (2013.01); *G06F 18/2185* (2023.01); *G06N 5/04* (2013.01)

(58) Field of Classification Search
CPC .. G06F 18/214; G06F 16/221; G06F 16/2282; G06F 16/2455; G06F 16/248; G06F 17/18; G06F 18/2185; G06N 5/04
See application file for complete search history.

(56) References Cited

U.S. PATENT DOCUMENTS 5,809,493 A 9/1998 Ahamed
7,246,116 B2 * 7/2007 Barsness ............. G06F 16/2462
707/999.005

(Continued)

OTHER PUBLICATIONS

Cafarella, et al., "Ten Years of WebTables", Proceedings of the VLDB Endowment, vol. 11, No. 12, 2018, pp. 2140-2149, <https://web.eecs.umich.edu/~michjc/papers/p2140-cafarella.pdf>.

(Continued)

*Primary Examiner* — Gregory M Desire
(74) *Attorney, Agent, or Firm* — Michael A. Petrocelli

(57) ABSTRACT

A computer answers a question using a data table. The computer receives a user question and a target table containing a target cell corresponding to a target answer for the user question, with the target cell corresponding to a target column and a target row. The computer generates, a first classifier to provide column correlation values reflecting the probability that a given column is the target column. The computer generates a second classifier that provides row correlation values reflecting the probability that a given row is the target row. The computer applies the first classifier to the target table to determine a column correlation value for each column. The computer applies the second classifier to the target table to determine a row correlation value for each row. The computer suggests, as the target cell, a cell having elevated column and row correlation values relative to other target table cells.

20 Claims, 9 Drawing Sheets

(51) Int. Cl.
     *G06F 16/2455*   (2019.01)
     *G06F 16/248*    (2019.01)
     *G06F 17/18*     (2006.01)
     *G06F 18/21*     (2023.01)
     *G06F 18/214*    (2023.01)
     *G06N 5/04*      (2023.01)

(56) References Cited

U.S. PATENT DOCUMENTS

| | | | | |
|---|---|---|---|---|
| 10,977,745 | B1* | 4/2021 | Chiang | G06F 16/835 |
| 11,080,336 | B2* | 8/2021 | Van Dusen | G06N 5/02 |
| 11,132,361 | B2* | 9/2021 | Yeo | G16H 10/20 |
| 11,270,213 | B2* | 3/2022 | Neelamana | G06N 5/022 |
| 11,354,755 | B2* | 6/2022 | Goldman | G06Q 40/123 |
| 11,461,317 | B2* | 10/2022 | Lin | G06F 16/245 |
| 11,556,716 | B2* | 1/2023 | Fan | G06F 40/284 |
| 11,580,321 | B2* | 2/2023 | Wentz | G06F 18/2321 |
| 11,693,855 | B2* | 7/2023 | Khorasani | G06F 16/24522 707/739 |
| 2015/0248475 | A1 | 9/2015 | Hamm | |
| 2015/0356463 | A1 | 12/2015 | Overell | |
| 2020/0042642 | A1 | 2/2020 | Bakis | |
| 2020/0257679 | A1* | 8/2020 | Sheinin | G06N 3/08 |
| 2022/0043981 | A1* | 2/2022 | Liang | G06F 40/30 |
| 2022/0044134 | A1* | 2/2022 | Joy | G06N 3/045 |

OTHER PUBLICATIONS

Cafarella, et al., "WebTables: Exploring the Power of Tables on the Web", Proceedings of the VLDB Endowment 1 (1), Jul. 2008, pp. 538-549, <https://www.researchgate.net/publication/220538521_WebTables_Exploring_the_power_of_tables_on_the_web>.

Chakrabarti, et al. "TableQnA: Answering List-Intent Queries With Web Tables", Proceedings of the VLDB Endowment, vol. 12, arXiv:2001.04828v1, Jan. 10, 2020, 13 pages, <https://arxiv.org/pdf/2001.04828>.

Cho, et al. "Adversarial TableQA: Attention Supervision for Question Answering on Tables", Proceedings of Machine Learning Research 80, ACML 2018, pp. 1-16.

Das Sarma, et al., "Finding Related Tables", SIGMOD '12, May 20-24, 2012, 12 pages, <i.stanford.edu/~anishds/publications/sigmod12/modi255i-dassarma.pdf>.

Deng, et al., "Table2Vec: Neural Word and Entity Embeddings for Table Population and Retrieval", SIGIR '19, 4 pages, <https://arxiv.org/pdf/1906.00041>.

Gao, et al., "Scientific Table Search Using Keyword Queries", arXiv:1707.03423v1, Jul. 11, 2017, 21 pages, <https://arxiv.org/abs/1707.03423>.

Glass, et al., "Inducing Implicit Relations from Text Using Distantly Supervised Deep Nets", ISWC 2018: The Semantic Web—ISWC, 2018, 7 pages, <https://link.springer.com/chapter/10.1007/978-3-030-00671-6_3>.

Hassanzadeh, et al. ,"Understanding a Large Corpus of Web Tables Through Matching with Knowledge Bases—An Empirical Study", OM 2015, 10 pages, <ceur-ws.org/Vol-1545/om2015_TLpaper3.pdf>.

Hassanzadeh, et al., "Semantic Concept Discovery over Event Databases", ESWC 2018: The Semantic Web, Abstract Only, 6 pages, <https://link.springer.com/chapter/10.1007/978-3-319-93417-4_19>.

Haug, et al., "Neural Multi-Step Reasoning for Question Answering on Semi-Structured Tables", arXiv:1702.06589v2, Mar. 22, 2018, 7 pages, <https://arxiv.org/pdf/1702.06589>.

Herzig, et al., "Decoupling Structure and Lexicon for Zero-Shot Semantic Parsing", arXiv:1804.07918v2, Sep. 22, 2018, 11 pages, <https://arxiv.org/abs/1804.07918>.

Herzig, et al., :"TAPAS: Weakly Supervised Table Parsing via Pre-training", arXiv:2004.02349v2, Apr. 21, 2020, 14 pages, <https://arxiv.org/pdf/2004.02349.pdf>.

Iyyer, et al., "Answering Complicated Question Intents Expressed in Decomposed Question Sequences", arXiv:1611.01242v1, Nov. 4, 2016, 9 pages, <https://arxiv.org/abs/1611.01242>.

Jauhar, et al.. "Tables as Semi-structured Knowledge for Question Answering", Proceedings of the 54th Annual Meeting of the Association for Computational Linguistics, 2016, pp. 474-483, <https://www.aclweb.org/anthology/P16-1045.pdf>.

Limaye, et al., "Annotating and Searching Web Tables Using Entities, Types and Relationships", Proceedings of the VLDB Endowment, vol. 3, No. 1, 2010, pp. 1338-1347, <vldb.org/pvldb/vldb2010/papers/R118.pdf>.

Liu, et al., TableRank: A Ranking Algorithm for Table Search and Retrieval, Association for the Advancement of Artificial Intelligence, 2007, pp. 317-322, <https://www.aaai.org/Papers/AAAI/2007/AAAI07-049.pdf>.

Mell et al., "The NIST Definition of Cloud Computing", National Institute of Standards and Technology, Special Publication 800-145, Sep. 2011, 7 pages.

Methani, et al., "PlotQA: Reasoning over Scientific Plots", arXiv:1909.00997v3, Feb. 1, 2020, 18 pages, <https://arxiv.brg/pdf/1909.00997.pdf>.

Neelakantan et al,. "Neural Programmer: Inducing Latent Programs With Gradient Descent", arXiv:1511.04834v3, Aug. 4, 2016, 18 pages.

Pimplikar, et al., "Answering Table Queries on the Web using Column Keywords", Proceedings of the VLDB Endowment, vol. 5, No. 10, 2012, pp. 908-919, <https://vldb.org/pvldb/vol5/p908_rakeshpimplikar_vldb2012.pdf>.

Pyreddy, et al., "TINTIN: a system for retrieval in text tables", DL '97: Proceedings of the second ACM international conference on Digital libraries, Jul. 1997, pp. 193-200, <https://doi.org/10.1145/263690.263816>.

Radlinski, et al., "A Theoretical Framework for Conversational Search", CHIIR '17, Mar. 7-11, 2017, 10 pages.

Roy, et al., "Theory and Experiments on Vector Quantized Autoencoders", arXiv:1805.11063v2, Jul. 20, 2018, 11 pages.

Sun, et al., "Knowledge-Aware Conversational Semantic Parsing Over Web Tables", arXiv:1809.04271v1, Sep. 12, 2018, 9 pages, <https://arxiv.org/abs/1809.04271>.

Venetis, et al., "Recovering Semantics of Tables on the Web", Proceedings of the VLDB Endowment, vol. 4, No. 9, 2011, pp. 528-538.

Wang, et al. "A Neural Question Answering Model Based on Semi-Structured Tables", Proceedings of the 27th International Conference on Computational Linguistics, 2018, pp. 1941-1951.

Yan, et al., "Content-Based Table Retrieval for Web Queries", arXiv:1706.02427v1, Jun. 8, 2017, 10 pages, <https://arxiv.org/abs/1706.02427>.

Yin, et al. "Neural Enquirer: Learning to Query Tables with Natural Language", arXiv:1512.00965v2, Jan. 21, 2016, 19 pages, <https://arxiv.org/pdf/1512.00965>.

Zhang, et al., "Ad Hoc Table Retrieval using Semantic Similarity", WWW 2018, 10 pages, <https://krisztianbalog.com/files/www2018-table.pdf>.

Zhang, et al., "Web Table Extraction, Retrieval, and Augmentation: A Survey", ACM Transactions on Intelligent Systems and Technology, vol. 11, No. 2, Article 13, Jan. 2020, 35 pages, <https://dl.acm.org/doi/pdf/10.1145/3372117>.

Zhong, et al., "SEQ2SQL: Generating Structured Queries From Natural Language Using Reinforcement Learning", arXiv:1709.00103v7, Nov. 9, 2017, 12 pages, <https://arxiv.org/pdf/1709.00103>.

Iyyer et al., "Search-based Neural Structured Learning for Seqential Question Answering", Proceedings of the 55th Annual Meeting of the Association for Computational Linguistics, Vancouver, Canada, Jul. 30-Aug. 4, 2017, pp. 1821-1831.

* cited by examiner

```
In what city and state is the Mustangs mascot located?
```

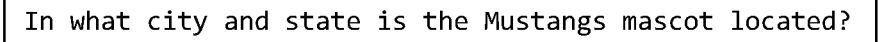

FIG. 5

|  (column content) 604 | (column content) 606 | (column content) 608 |  |
|---|---|---|---|
| School | Mascot | Location | 610 |
| Carson | Senators | Carson City, Nevada | |
| Damonte | Mustangs | Reno, Nevada | 612 |
| Douglas | Tigers | Minden, Nevada | 614 |

FIG. 6

```
[CLS] In what city and state is the Mustangs mascot located? [SEP]
Location: Carson City, Nevada | Reno, Nevada | Minden, Nevada [SEP]
```

FIG. 7A 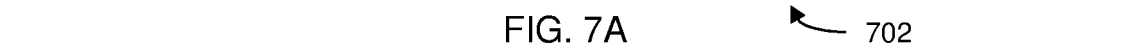

```
[CLS] In what city and state is the Mustangs mascot located? [SEP]
School: Damonte Ranch | Mascot: Mustangs | Location: Reno, Nevada [SEP]
```

FIG. 7B

[CLS] In what
city and state
is the Mustangs
mascot located?
[SEP]
↑
└ 802
FIG. 8A
[CLS] Location:
Carson City, Nevada
| Reno, Nevada |
Minden, Nevada
[SEP]
↑
└ 804
FIG. 8B
[CLS] School:
Damonte Ranch |
Mascot: Mustangs |
Location: Reno,
Nevada [SEP]
↑
└ 806
FIG. 8C
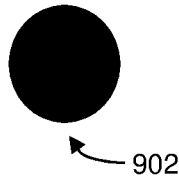
— 902
FIG. 9A
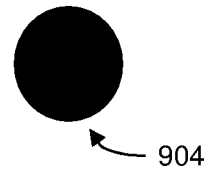
— 904
FIG. 9B
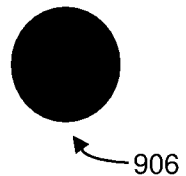
— 906
FIG. 9C

ANSWERING QUESTIONS WITH ARTIFICIAL INTELLIGENCE USING TABULAR DATA

BACKGROUND

The present invention relates generally to the field of Artificial Intelligence (AI), and more specifically, to computerized systems that answer questions using data from tables.

Tables can be the source of semi-structured data, providing an efficient and organized way to collect and present information for a variety of topics. Many facts are expressed in tabular format, and large amounts of information can be provided in a single table. Information in tables can provide answers to some questions (e.g., lookup questions) directly, while other the answers to other questions (e.g., aggregation questions) require interpretation or other processing of tabular data.

Through Natural Language Processing (NLP) and other types of AI, computers can answer many natural language questions using data contained in tables. Many publicly-available online search engines provide answers to user questions, over many fields of interest, in this manner.

As the amount of information stored in tables available in general-content and publicly-available datasets (e.g., WikiTableQuestions, WikiSQL, etc.) and in domain-specific and privately-held datasets increases, so does the importance of computerized methods to search tabular data to automatically find answers to posed questions.

SUMMARY

According to one embodiment, a computer-implemented method to answer a question using a data table, includes receiving, by the computer, a user question and a target table containing a target cell corresponding to a target answer for the user question, with the target cell corresponding to a target column and a target row. The computer generates, a first classifier adapted to provide column correlation values reflecting the probability that a given column is the target column. The computer generates a second classifier that provides row correlation values reflecting the probability that a given row is the target row. The computer applies the first classifier to the columns in the target table to determine a column correlation value for each column. The computer applies the second classifier to the rows in the target table to determine a row correlation value for each row. The computer suggests, as the target cell, a cell having elevated column and row correlation values relative to other cells in the target table. According to aspects of the invention, the method further includes the computer receiving a set of training data including a training question, a training table, and identification of a ground truth target answer cell location within the training table, with the target cell location corresponding to a target column and a target row. According to aspects of the invention, the method further includes the computer tuning the first classifier to provide column correlation values using the training data; and the computer fine-tuning the second classifier to provide row correlation values using the training data. According to aspects of the invention, the fine tuning is conducted by the computer at least on part with weak supervision. According to aspects of the invention, the target cell has the highest row relevance value within a group of cells located in a column having a highest column correlation value. According to aspects of the invention, the classifier is a pre-trained transformer-model adapted to execute a next sentence prediction task. According to aspects of the invention, the classifier is a linear regression model adapted to classify feature vectors. According to aspects of the invention, the computer further receives a feature vector representation of the user question, the target table columns, and the target table rows. According to aspects of the invention, the column correlation values and row correlation values are generated by the computer, at least in part by classifying the feature vector representation.

According to another embodiment a system to answer a question using a data table, which comprises: a computer system comprising a computer readable storage medium having program instructions embodied therewith, the program instructions executable by a computer to cause the computer to: receive a user question and a target table containing a target cell corresponding to a target answer for said user question, said target cell corresponding to a target column and a target row; generate a first classifier adapted to provide column correlation values reflecting the probability that a given column is said target column; generate a second classifier adapted to provide row correlation values reflecting the probability that a given row is said target row; apply said first classifier to the columns in the target table to determine a column correlation value for each column; apply said second classifier to the rows in the target table to determine a row correlation value for each row; suggest as the target cell, a cell having elevated column and row correlation values relative to other cells in the target table.

According to another embodiment a computer program product to answer a question using a data table, the computer program product comprising a computer readable storage medium having program instructions embodied therewith, the program instructions executable by a computer to cause the computer to: receive, using said computer, a user question and a target table containing a target cell corresponding to a target answer for said user question, said target cell corresponding to a target column and a target row; generate, using said computer, a first classifier adapted to provide column correlation values reflecting the probability that a given column is said target column; generate, using said computer, a second classifier adapted to provide row correlation values reflecting the probability that a given row is said target row; apply, using said computer, said first classifier to the columns in the target table to determine a column correlation value for each column; apply, using said computer, said second classifier to the rows in the target table to determine a row correlation value for each row; suggest, using said computer, as the target cell, a cell having elevated column and row correlation values relative to other cells in the target table.

In embodiments according to the present invention, a computer implemented method to optimize input component enablement for several participants in an electronic group meeting includes a computer that identifies a group of communication devices (e.g., computers, telephones, etc.) joined together for use by a group of meeting participants. Each of the communication devices has a microphone, each of the participants is associated with one of the microphones, and some of the participants are characterized by identification attributes (for example, participant name or subject matter expertise). The computer receives audio input from the participants via the microphones and measures certain quality-based attributes of the audio input to provide associated quality metrics. The audio input can include any audio throughput received by the computer, which can include background noise, a participant's voice, and meeting content, as well as audio signal quality assessments. The computer uses these metrics to determine whether any of the input exceeds a quality threshold and places microphones providing quality threshold-exceeding input into an active speaking mode. The computer also evaluates content of participant audio input and identifies a current concept of focus. The computer then places into an active speaking mode any microphones that are associated with participant having identification attributes that correspond to the current concept of focus.

In another embodiment of the invention, a system to optimize input component enablement for a plurality of communication devices each having an input component associated with at least one participant in an electronic group meeting, which comprises: a computer system comprising a computer readable storage medium having program instructions embodied therewith. The program instructions are executable by a computer to cause the computer to: identify a plurality of communication devices, each having an audio input component, said audio input components each being associated with at least one of a plurality of a group of participants, wherein at least one of said participants is characterized by an identification attribute; receive an audio input from a first of said audio input components; measure preselected qualitative attributes of said audio input to provide a set of quality metrics; determine whether said set of quality metrics exceeds a threshold for quality; place into an active speaking mode said first audio input component when said set of quality metrics exceeds said threshold for quality; evaluate content of said audio input to identify a concept of focus; place into an active speaking mode any audio input component associated with one of said participants characterized by said identification attribute when said identification attribute corresponds to said identified concept of focus.

In another embodiment of the invention, a computer program product optimizes input component enablement for a plurality of participants in an electronic group meeting. The computer program product comprises a computer readable storage medium having program instructions embodied therewith. The program instructions are executable by a computer to cause the computer to: identify a plurality of communication devices, each having an audio input component, said audio input components each being associated with at least one of a plurality of group participants, wherein at least one of said participants is characterized by an identification attribute; receive an audio input from one of said audio input components; measure content and preselected qualitative attributes of said audio input to provide, respectively, a topic of focus and a set of quality metrics; determine whether said set of quality metrics exceeds a threshold for quality; and place into an active speaking mode any audio input component that is associated with one of said participants having an identification attribute corresponding to said topic of focus or for which said set of quality metrics exceeds said threshold for quality.

The present disclosure recognizes the shortcomings and problems associated with accessing large amounts of data to find answers for lookup questions and uses a row and column intersection approach to identify table cells most-likely to contain answers to lookup questions.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. The drawings are set forth as below as:

FIG. 5 is a sample natural language question suitable for use with the present invention.

FIG. 6 is a table containing an answer to the question shown in FIG. 5 presented in a format suitable for use with the present invention.

FIG. 7A is a formatted text string sequence pair representation of the natural language question shown in FIG. 5 and one column from the table shown in FIG. 6.

FIG. 7B is a formatted text string representation of the natural language question shown in FIG. 5 and one row from the table shown in FIG. 6.

FIG. 8A is a formatted text string representation of the natural language question shown in FIG. 5.

FIG. 8B is a formatted text string representation of one column from the table shown in FIG. 6.

FIG. 8C is a formatted text string representation of one row from the table shown in FIG. 6.

FIG. 9A is a feature vector representation of the formatted text string shown in FIG. 8A.

FIG. 9B is a feature vector representation of formatted text string shown in FIG. 8B.

FIG. 9C is a feature vector representation of formatted text string shown in FIG. 8C.

DETAILED DESCRIPTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a participant" includes reference to one or more of such participants unless the context clearly dictates otherwise.

Figure 1:
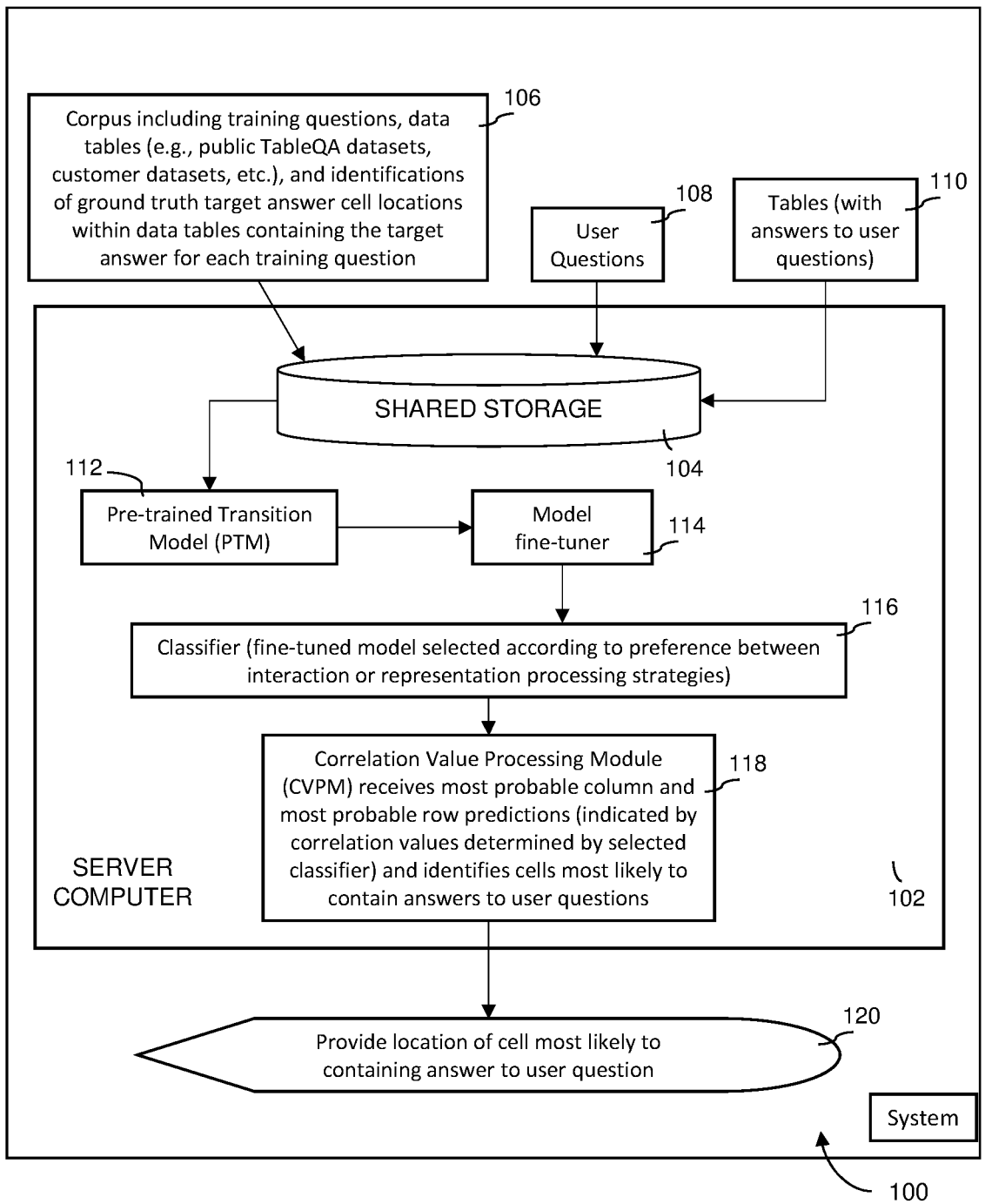
FIG. 1 is a schematic block diagram illustrating an overview of a system for a computer-implemented method of automatically identifying tabular cells that contain answers to presented questions.
Figure 2:
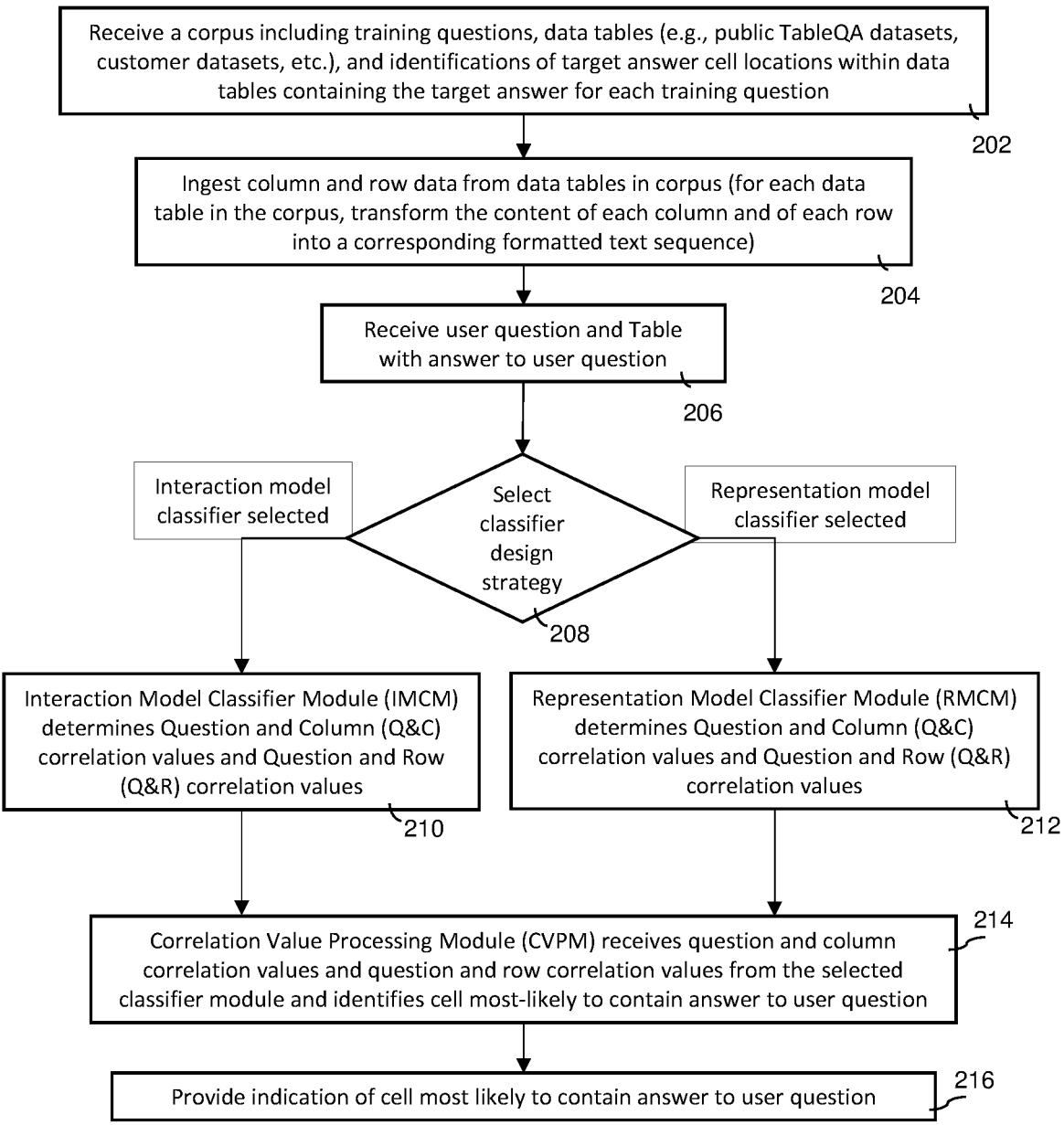
FIG. 2 is a flowchart illustrating a method, implemented using the system shown in FIG. 1, of automatically identifying tabular cells that contain answers to presented questions according to aspects of the invention.

Now with combined reference to the Figures generally and with particular reference to FIG. 1 and FIG. 2, an overview of a method for automatically identifying tabular cells that contain answers to presented questions usable within a system 100 as carried out by a server computer 102 having optionally shared storage 104 and aspects to automatically identify tabular cells containing answers to presented questions, according to an embodiment of the present disclosure, is shown. The server computer 102 is in communication with a corpus 106 that includes training questions, data tables, and identifications of ground truth target answer cell locations within data tables containing the target answer for each training question. The sever computer 102 also receives one or more user questions 108 and tables 110 with answers to the user questions. The server computer 102 includes a Pre-trained Transition-based Model (PTM) 112 (e.g., such as BERT, GPT-2, etc.) suitable for transfer learning. The server computer 102 includes a model fine-tuner 114 that trains the PTM 112 for tasks appropriate for aspects of this invention (e.g., customized sequence-pair assessment and customized text string classification). The server computer 102 includes a specialized classifier 116 selected according to a preference for increased accuracy (e.g., an interaction model classifier) or increased efficiency (e.g., a representation model) that determines the probability that given columns and rows in a selected table contain a target answer for a posed question. The classifier 116 makes these probability determinations cooperatively and sends them to the Correlation Value Processing Module (CVPM) 118. The CVPM identifies cells most likely to contain answers to user questions and passes this determination to a display 120 (or otherwise provide to a user) the cell location most likely to contain an answer to the user's question.

Now with Reference to FIG. 2, an overview of a method of automatically identifying tabular cells that contain answers to presented questions using the system shown in FIG. 1 will be described. The server computer 102 receives, at block 202, a corpus including training questions, data tables (e.g., public TableQA datasets, customer datasets, etc.), and identifications of target answer cell locations within data tables in containing the target answer for each training question. The server computer 102 ingests, at block 204, column and row data from data tables in the corpus. With additional reference to FIG. 6, for each data table 602 in the corpus, the server computer 102 transforms the content of each column 604, 606, and 608 and of each row 610 into corresponding formatted text sequences 804, 806 examples of which are shown respectively in FIG. 8B and FIG. 8C. In one embodiment, the column strings 804 begin with the column header, followed by a colon ":" and the remaining cells in the column (up to a maximum length) follow, with cell values being separated by a pipe "|". Rows strings 806 are the sequence of cell values with each cell value prefixed by the column header for that column, followed by a colon ":". Cell values are separated by a pipe "|".

The server computer 102 receives at block 206 a user question 108 and table 110 with an answer to user question. The sever computer 102 at block 208 passes control to one of two classifier modules 210, 212. Depending on the judgment of one skilled in this field, the server computer will use a classifier that either focuses on accuracy, as in the case of the Interaction Model Classifier Module (IMCM) 210, or on efficiency, as in the case of the Representation Model Classifier Module (RMCM) 212. As described more fully below, each of these classifier modules 210, 212 determines which column 604, 606, 608 and which row 610, 612, 614 within a target table 110 is most likely to contain the target answer to a specific user question 502 (e.g., as shown in FIG. 5) and the server computer receives and processes this information at block 214 to identify which cell (e.g., as in the example shown in FIG. 5 and FIG. 6, the intersection of column 608 and row 612) in the target table 110 contains the answer to the user question 108. This server computer 102 passes this information, at block 216, to a display 120 (or other output device selected according to the judgment of one skilled in this field) as an indication of the cell most likely to contain the target answer to the user question 108. As used herein, the terms "target answer" (and similarly, "target cell") refer to an answer accepted to be correct; this answer (and cell location) represent the answer an expert or other knowledgeable user would select, if manually consulting the identified table 110.

Figure 3:
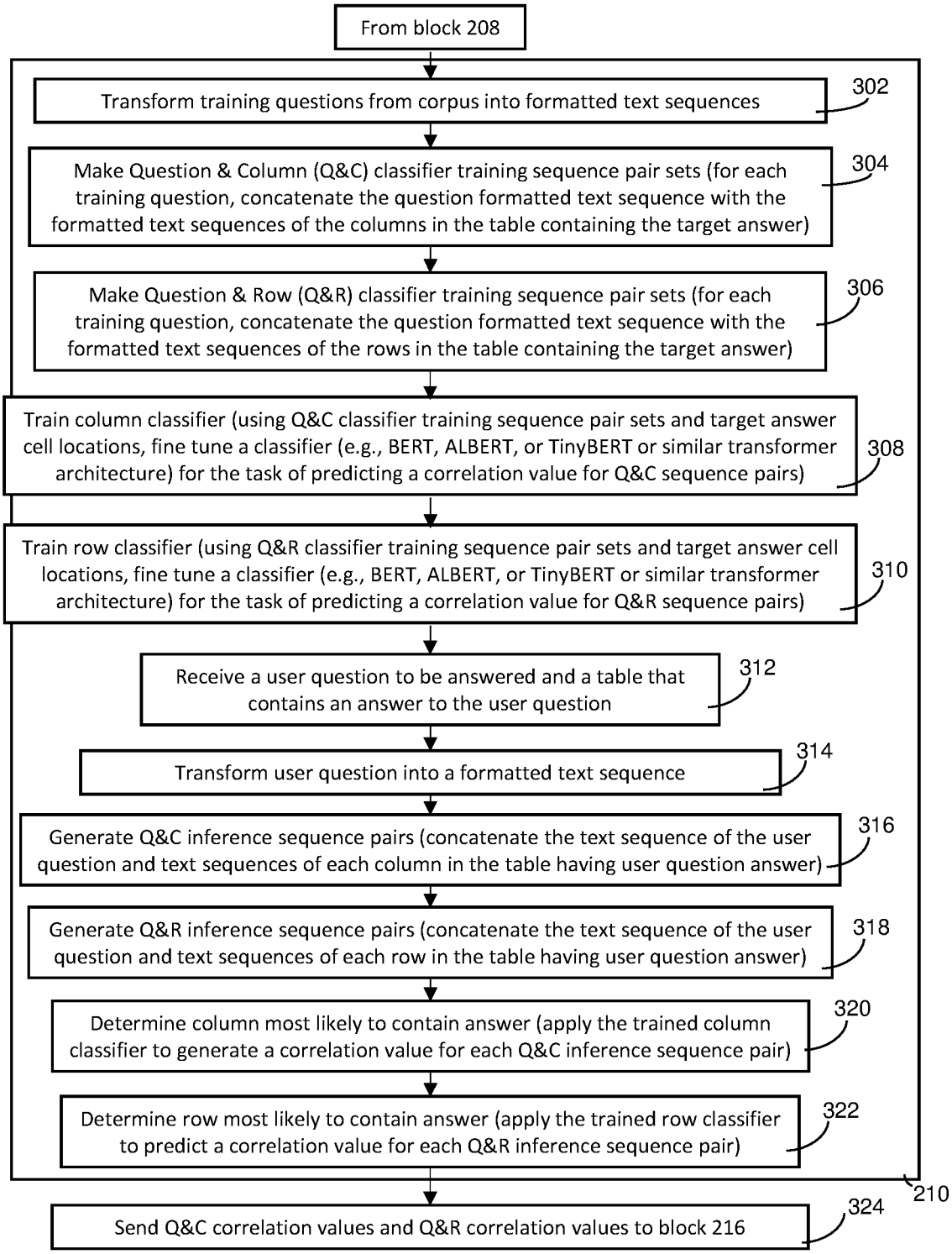
FIG. 3 is a flowchart illustrating details of an interaction model embodiment of the classifier module shown in FIG. 1.

If a system designer chooses to focus on accuracy when determining the location of the target cell, the IMCM 210 is used, and that module will now be described. As seen with additional reference to FIG. 3, after deciding, at block 208 to use the IMCM 210, the sever computer 102 transforms, at block 302, the training questions from corpus 106 into formatted text sequences 802 (e.g., as shown in FIG. 8A).

The server computer 102, at block 304, makes Question & Column (Q&C) classifier training sequence pair sets. In particular, for each training question, the server computer concatenates the question formatted text sequence 802 with the formatted text sequences of the columns 604, 606, 608 in the table 602 containing the target answer. The format of Q&C classifier training sequence pairs (which is the same format as Q&C classifier inference sequence pairs 702) is shown in FIG. 7A.

The server computer 102, at block 306, makes Question & Row (Q&R) classifier training sequence pair sets. In particular, for each training question, the server computer concatenates the question formatted text sequence 802 with the formatted text sequences of the rows 610, 612, 614 in the table 602 containing the target answer. The format of Q&R classifier training sequence pairs (which is the same format as Q&R classifier inference sequence pairs 704) is shown in FIG. 7B.

The server computer 102, at block 308, trains an interaction model column classifier, using Q&C classifier training sequence pair sets and target answer cell locations, to fine tune a pre-trained, transformer-based classifier (e.g., BERT, ALBERT, or TinyBERT or similar transformer architecture) for the task of predicting a correlation value for Q&C sequence pairs). Each correlation value corresponds to the probability that an associated column contains the target answer for a presented question 108. This approach beneficially combines customized task training (via weak supervision fine tuning) and with large dataset awareness and the associated opportunities for transfer learning (via use of a pretrained model, e.g., like BERT or similar model selected by one skilled in this field).

The server computer 102, at block 310, trains an interaction model row classifier, using Q&R classifier training sequence pair sets and target answer cell locations, to fine tune a pre-trained, transformer-based classifier (e.g., BERT, ALBERT, or TinyBERT or similar transformer architecture) for the task of predicting a correlation value for Q&R sequence pairs). Each correlation value corresponds to the probability that an associated row contains the target answer for a presented question 108. As noted above, this approach beneficially combines customized task training (via weak supervision fine tuning) and with large dataset awareness and the associated opportunities for transfer learning (via use of a pretrained model, e.g., like BERT or similar model selected by one skilled in this field).

The server computer 102, at block 312, receive a user question 108 to be answered and a table 110 that contains an answer to the user question. As noted elsewhere, representative examples of a user question 502 and identified table 602 are shown in FIG. 5 and FIG. 6. The server computer 102, transforms at block 314, the user question 502 into a formatted text sequence 802.

The server computer 102 generates, at block 316, Q&C inference sequence pairs 702 by concatenating the text sequence 802 of the user question 502 and text sequences 804 of each column 604, 606, 608 in the target table 602 containing the user question answer. The server computer 102 generates, at block 318, Q&R inference sequence pairs 704 by concatenating the text sequence 802 of the user question 502 and text sequences 806 of each row 610, 612, 614 in the target table 602 containing the user question answer.

The server computer 102, at block 320 determines the column most likely to contain the answer to the user question by applying the trained column classifier to the Q&C inference sequence pairs 702. The fine-tuned model treats each pair of question and column strings as candidates in a next sentence prediction task, and the classifier generates a correlation value (e.g., a probability that the question and column string are related) for each sequence pair. The sequence pair having the highest correlation value indicates which column 604, 606, 608 is most likely to contain the answer to the presented question 502. In the given example, column 610 would be identified. The server computer 102, at block 322 determines the row most likely to contain the answer to the user question by applying the trained row classifier to the Q&R inference sequence pairs 704. The fine-tuned model treats each pair of question and row strings as candidates in a next sentence prediction task, and the classifier generates a correlation value (e.g., a probability that the question and row string are related) for each sequence pair. The sequence pair having the highest correlation value indicates which row 610, 612, 614 is most likely to contain the answer to the presented question 502. In the given example, column 612 would be identified. The server computer 102, at block 324 passes the Q&C and Q&R correlation values to the CVPM 118 in block 214 for further use, as indicated above.

Figure 4:
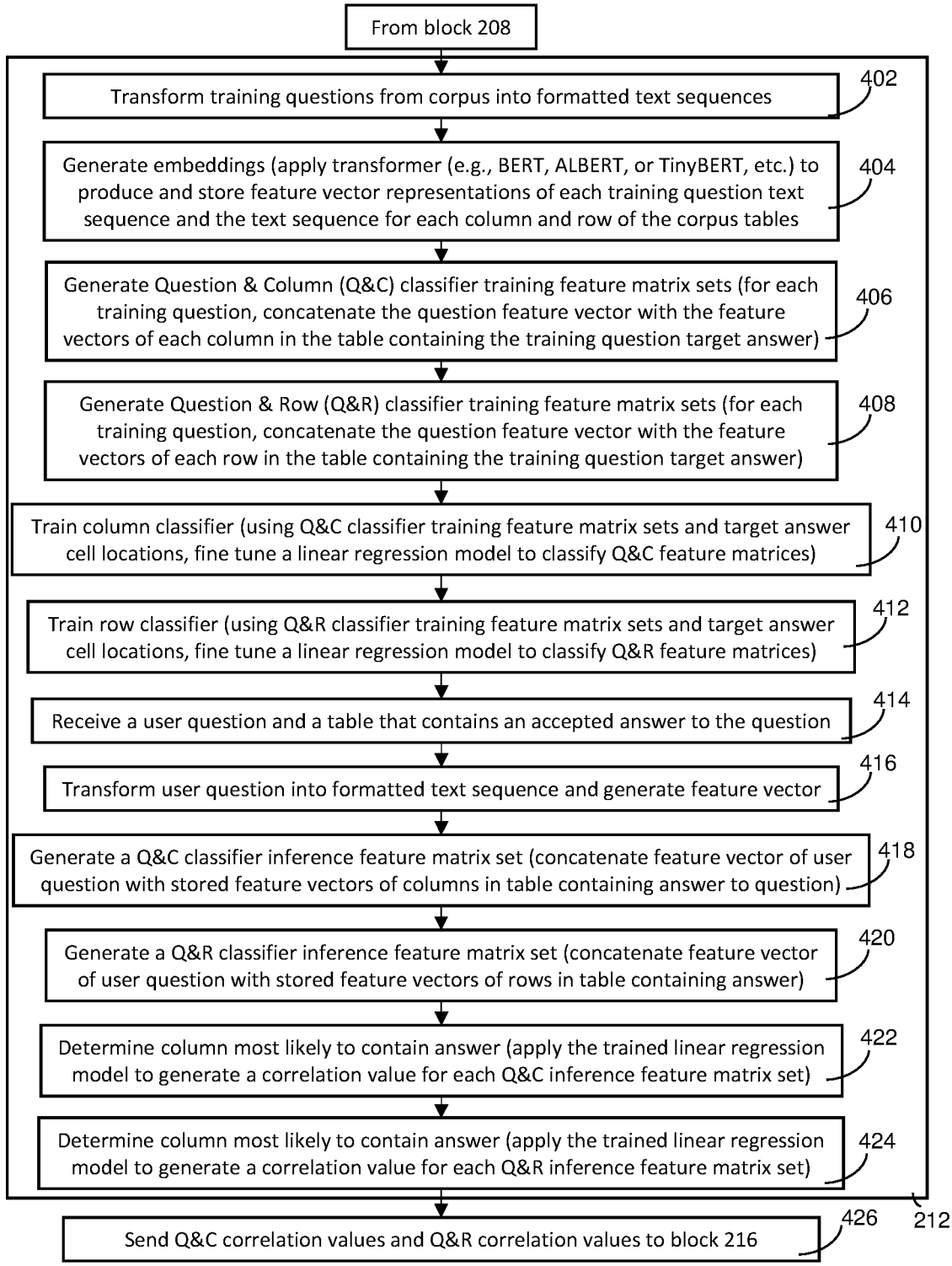
FIG. 4 is a flowchart illustrating details of a representation model embodiment of the classifier module shown in FIG. 1.
Figure 10:
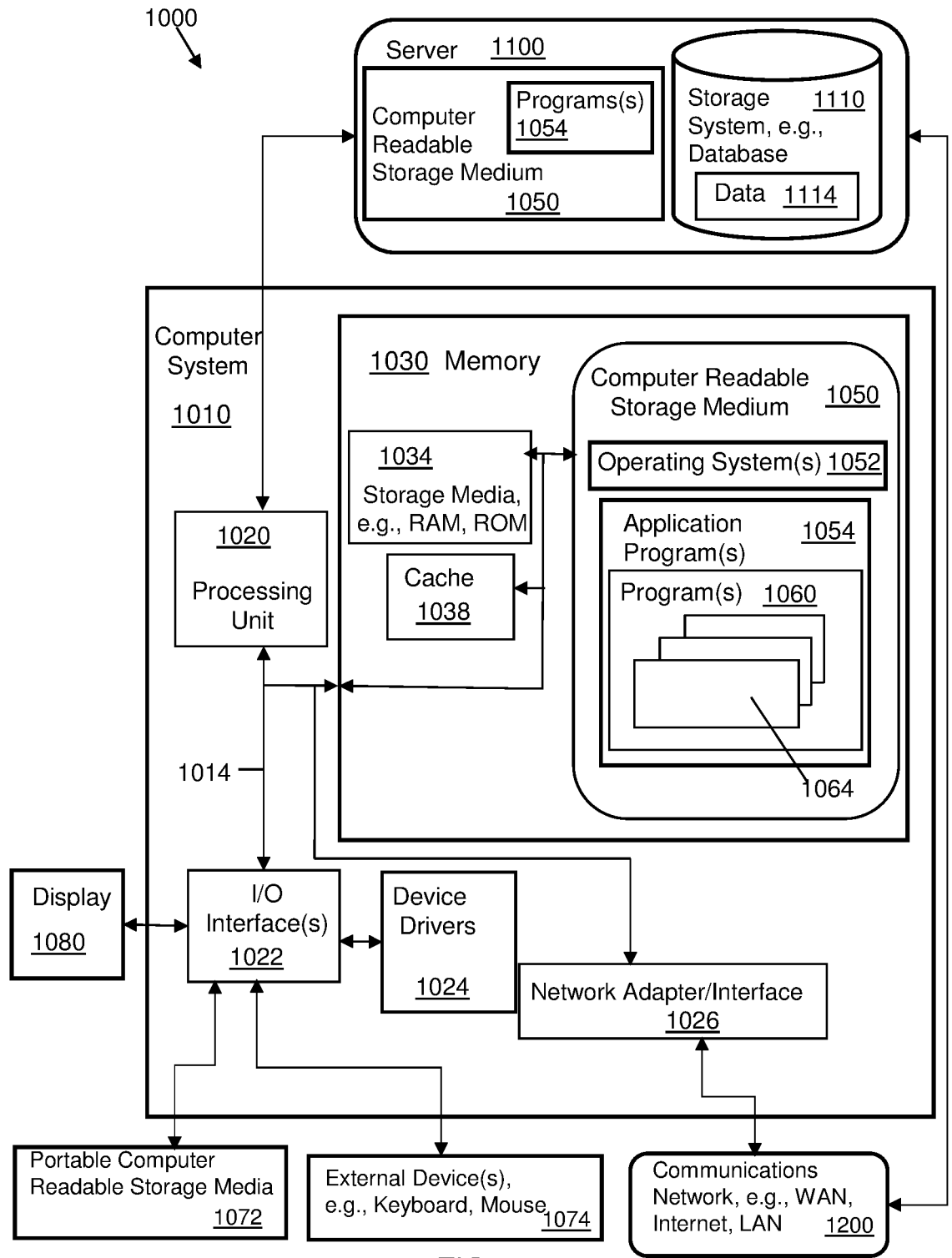
FIG. 10 is a schematic block diagram depicting a computer system according to an embodiment of the disclosure which may be incorporated, all or in part, in one or more computers or devices shown in FIG. 1, and cooperates with the systems and methods shown in FIG. 1.

If a system designer chooses to focus on efficiency when determining the location of the target cell, the RMCM 212 is used, and that module will now be described. As seen with additional reference to FIG. 4, after deciding, at block 208 to use the RMCM 210, the sever computer 102 transforms, at block 402, the training questions from corpus 106 into formatted text sequences 802 (e.g., as shown in FIG. 8A).

The server computer 102 generates and stores, at block 404 embeddings for each training question text sequence 802 (e.g., as shown in FIG. 8A) and the text sequences 804, 806 (e.g., as shown in FIG. 8B and FIG. 8C) for each column and row of tables in the corpus 106. The embeddings 902, 904, 906 (e.g., as shown in FIG. 9A, FIG. 9B, and FIG. 9C) are produced applying a transformer model (e.g., BERT, ALBERT, or TinyBERT, etc.) to the text sequences 802, 804, 806 described above to return feature vector representations of each associated text sequence. In one embodiment, not shown, each embedding is a content-specific, text-based 768-tuple. In another embodiment shown in FIG. 9A, FIG. 9B, and FIG. 9C, the embeddings are content-specific, graphical representations of a feature vector associated with each text sequence. According to aspects of the invention, text-based tuples and graphical representations may be selected in accordance with the judgment of skilled in this field to provide effective results.

The server computer 102, generates at block 406, Question & Column (Q&C) classifier training feature matrix sets. In particular, the server computer 102, for each training question, concatenates the question feature vector 902 with the feature vectors 904 of each column in the table containing the training question target answer.

The server computer 102, generates at block 408, Question & Row (Q&R) classifier training feature matrix sets. In particular, the server computer 102, for each training question, concatenates the question feature vector 902 with the feature vectors 906 of each row in the table containing the training question target answer.

The server computer 102, at block 410, trains a representation model column classifier, using Q&C classifier training feature matrix sets and target answer cell locations, to fine tune a linear regression model for the task of classifying Q&C feature matrices, generating a classification-based correlation value for each feature matrix set. Each correlation value corresponds to the probability that an associated column contains the target answer for a presented question 108. This approach beneficially combines customized task training (with a quick linear regression model) and with large dataset awareness and the associated opportunities for transfer learning (via use of a pretrained model, e.g., like BERT or similar model selected by one skilled in this field).

The server computer 102, at block 412, trains a representation model row classifier, using Q&R classifier training feature matrix sets and target answer cell locations, to fine tune a linear regression model for the task of classifying Q&R feature matrices, generating a classification-based correlation value for each feature matrix set. Each correlation value corresponds to the probability that an associated row contains the target answer for a presented question 108. As noted above, this approach beneficially combines customized task training (with a quick linear regression model) and with large dataset awareness and the associated opportunities for transfer learning (via use of a pretrained model, e.g., like BERT or similar model selected by one skilled in this field).

The server computer 102 receives at block 414, a user question 502 and a table 602 that contains an accepted answer to the question. The server computer 102, at block 416, transforms the user question 502 into formatted text sequence 802 and generates a feature vector 902. The server computer 102, at block 418, generates a Q&C classifier inference feature matrix set. According to aspects of some embodiments, this is efficiently accomplished by concatenating the user question feature vector 902 with previously-stored feature vectors 904 of columns in the target table 602 containing an answer to the user question. The server computer 102, at block 420, generates a Q&R classifier inference feature matrix set. According to aspects of some embodiments, this is efficiently accomplished by concatenating the user question feature vector 902 with previously-stored feature vectors 906 of rows in the target table 602 containing an answer to the user question.

The server computer 102, at block 422, determines the column most likely to contain the user question answer. In particular, the server computer 102 apply the trained linear regression model to generate a correlation value for each Q&C inference feature matrix set. The fine-tuned model treats each Q&C inference feature matrix set as a classification task and generates correlation values (e.g., a probability that the question and column string are related) for the set. The set having the highest correlation value indicates which column 604, 606, 608 is most likely to contain the answer to the presented question 502. In the given example, column 610 would be identified.

The server computer 102, at block 424 determines the row most likely to contain the user question answer. In particular, the server computer 102 apply the trained linear regression model to generate a correlation value for each Q&R inference feature matrix set. The fine-tuned model treats each Q&R inference feature matrix set as a classification task and generates correlation values (e.g., a probability that the question and row string are related) for the set. The set having the highest correlation value indicates which row 610, 612, 614 is most likely to contain the answer to the presented question 502. In the given example, column 612 would be identified. The server computer 102, at block 426 passes the Q&C and Q&R correlation values to the CVPM 118 in block 214 for further use, as indicated above.

It is noted that while aspects of the present invention generate inference feature matrix sets by concatenating component feature vectors for classification, suitable correlation values may also be determined by comparing feature vectors of questions and columns, as well as feature vectors of questions and rows, directly.

Regarding the flowcharts and block diagrams, the flowchart and block diagrams in the Figures of the present disclosure illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 12:
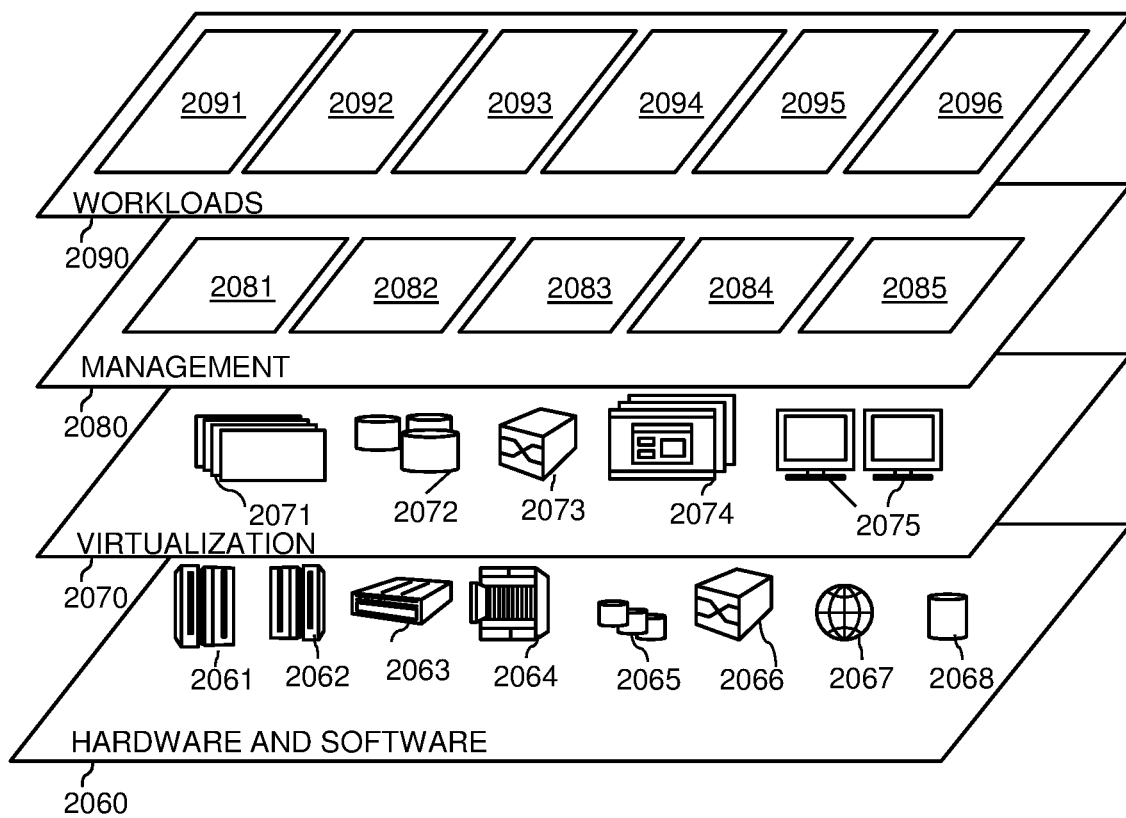
FIG. 12 depicts abstraction model layers according to an embodiment of the present invention.

Referring to FIG. 12, a system or computer environment 1000 includes a computer diagram 1010 shown in the form of a generic computing device. The method 100, for example, may be embodied in a program 1060, including program instructions, embodied on a computer readable storage device, or computer readable storage medium, for example, generally referred to as memory 1030 and more specifically, computer readable storage medium 1050. Such memory and/or computer readable storage media includes non-volatile memory or non-volatile storage. For example, memory 1030 can include storage media 1034 such as RAM (Random Access Memory) or ROM (Read Only Memory), and cache memory 1038. The program 1060 is executable by the processor 1020 of the computer system 1010 (to execute program steps, code, or program code). Additional data storage may also be embodied as a database 1110 which includes data 1114. The computer system 1010 and the program 1060 are generic representations of a computer and program that may be local to a user, or provided as a remote service (for example, as a cloud based service), and may be provided in further examples, using a website accessible using the communications network 1200 (e.g., interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in the figure as program modules 1064. The program 1060 and program modules 1064 can execute specific steps, routines, sub-routines, instructions or code, of the program.

The method of the present disclosure can be run locally on a device such as a mobile device, or can be run a service, for instance, on the server 1100 which may be remote and can be accessed using the communications network 1200. The program or executable instructions may also be offered as a service by a provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

The computer 1010 can include a variety of computer readable media. Such media may be any available media that is accessible by the computer 1010 (e.g., computer system, or server), and can include both volatile and non-volatile media, as well as, removable and non-removable media. Computer memory 1030 can include additional computer readable media in the form of volatile memory, such as random access memory (RAM) 1034, and/or cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media.

The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention.

The method(s) described in the present disclosure, for example, may be embodied in one or more computer programs, generically referred to as a program 1060 and can be stored in memory 1030 in the computer readable storage medium 1050. The program 1060 can include program modules 1064. The program modules 1064 can generally carry out functions and/or methodologies of embodiments of the invention as described herein. The one or more programs 1060 are stored in memory 1030 and are executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020. It is also understood that the application 1054 and program(s) 1060 are shown generically, and can include all of, or be part of, one or more applications and program discussed in the present disclosure, or vice versa, that is, the application 1054 and program 1060 can be all or part of one or more applications or programs which are discussed in the present disclosure. It is also understood that the control system 70 (shown in FIG. 12) can include all or part of the computer system 1010 and its components, and/or the control system can communicate with all or part of the computer system 1010 and its components as a remote computer system, to achieve the control system functions described in the present disclosure. It is also understood that the one or more communication devices 110 shown in FIG. 1 similarly can include all or part of the computer system 1010 and its components, and/or the communication devices can communicate with all or part of the computer system 1010 and its components as a remote computer system, to achieve the computer functions described in the present disclosure.

One or more programs can be stored in one or more computer readable storage media such that a program is embodied and/or encoded in a computer readable storage medium. In one example, the stored program can include program instructions for execution by a processor, or a computer system having a processor, to perform a method or cause the computer system to perform one or more functions.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via the Input/Output (I/O) interfaces 1022. Still yet, the computer 1010 can communicate with one or more networks 1200 such as a local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 11:
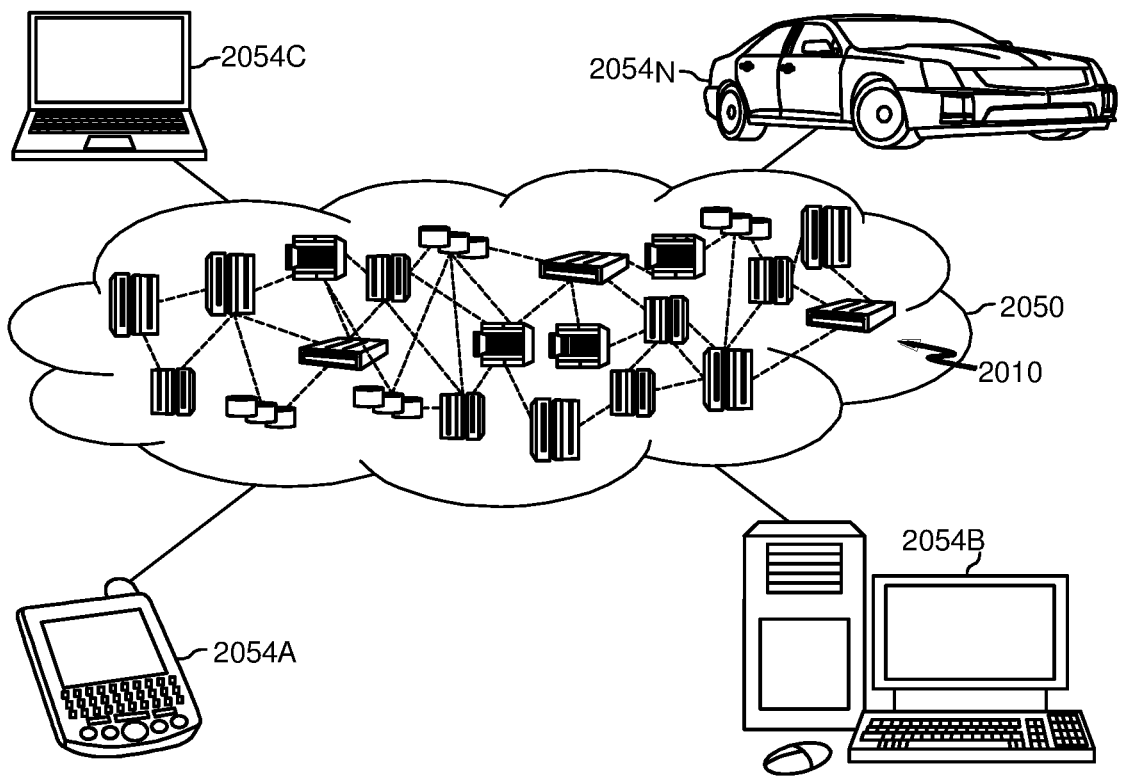
FIG. 11 depicts a cloud computing environment according to an embodiment of the present invention.

Referring now to FIG. 11, illustrative cloud computing environment 2050 is depicted. As shown, cloud computing environment 2050 includes one or more cloud computing nodes 2010 with which local computing devices used by cloud consumers, such as, for example, personal digital assistant (PDA) or cellular telephone 2054A, desktop computer 2054B, laptop computer 2054C, and/or automobile computer system 2054N may communicate. Nodes 2010 may communicate with one another. They may be grouped (not shown) physically or virtually, in one or more networks, such as Private, Community, Public, or Hybrid clouds as described hereinabove, or a combination thereof. This allows cloud computing environment 2050 to offer infrastructure, platforms and/or software as services for which a cloud consumer does not need to maintain resources on a local computing device. It is understood that the types of computing devices 2054A-N shown in FIG. 11 are intended to be illustrative only and that computing nodes 2010 and cloud computing environment 2050 can communicate with any type of computerized device over any type of network and/or network addressable connection (e.g., using a web browser).

Referring now to FIG. 12, a set of functional abstraction layers provided by cloud computing environment 2050 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 2060 includes hardware and software components. Examples of hardware components include: mainframes 2061; RISC (Reduced Instruction Set Computer) architecture based servers 2062; servers 2063; blade servers 2064; storage devices 2065; and networks and networking components 2066. In some embodiments, software components include network application server software 2067 and database software 2068.

Virtualization layer 2070 provides an abstraction layer from which the following examples of virtual entities may be provided: virtual servers 2071; virtual storage 2072; virtual networks 2073, including virtual private networks; virtual applications and operating systems 2074; and virtual clients 2075.

In one example, management layer 2080 may provide the functions described below. Resource provisioning 2081 provides dynamic procurement of computing resources and other resources that are utilized to perform tasks within the cloud computing environment. Metering and Pricing 2082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 2083 provides access to the cloud computing environment for consumers and system administrators. Service level management 2084 provides cloud computing resource allocation and management such that required service levels are met. Service Level Agreement (SLA) planning and fulfillment 2085 provide pre-arrangement for, and procurement of, cloud computing resources for which a future requirement is anticipated in accordance with an SLA.

Workloads layer 2090 provides examples of functionality for which the cloud computing environment may be utilized. Examples of workloads and functions which may be provided from this layer include: mapping and navigation 2091; software development and lifecycle management 2092; virtual classroom education delivery 2093; data analytics processing 2094; transaction processing 2095; and automatically identifying tabular cells that contain answers to presented questions 2096.

The descriptions of the various embodiments of the present invention have been presented for purposes of illustration, but are not intended to be exhaustive or limited to the embodiments disclosed. Likewise, examples of features or functionality of the embodiments of the disclosure described herein, whether used in the description of a particular embodiment, or listed as examples, are not intended to limit the embodiments of the disclosure described herein, or limit the disclosure to the examples described herein. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method to answer a question using a data table, comprising:
   receiving, by said computer, a user question and a target table containing a target cell corresponding to a target answer for said user question, said target cell corresponding to a target column and a target row;
   generating, by said computer, a first classifier adapted to provide column correlation values reflecting the probability that a given column is said target column;
   generating, by said computer, a second classifier adapted to provide row correlation values reflecting the probability that a given row is said target row;
   applying, by said computer, said first classifier to the columns in the target table to determine a column correlation value for each column;
   applying, by said computer, said second classifier to the rows in the target table to determine a row correlation value for each row;
   suggesting, by said computer, as the target cell, a cell having elevated column and row correlation values relative to other cells in the target table;
   receiving, by said computer, a set of training data; and
   fine-tuning, by said computer using said training data, said first classifier and said second classifier.

2. The method of claim 1, wherein said method further comprises:
   the receiving, by said computer, of the set of training data including a training question, a training table, and identification of a ground truth target answer cell location within said training table, said target cell location corresponding to a target column and a target row;
   the fine-tuning, by said computer, of said first classifier to provide, by said computer, column correlation values using said training data; and
   the fine-tuning, by said computer, of said second classifier to provide, by said computer, row correlation values using said training data.

3. The method of claim 2, wherein said fine tuning is conducted, by said computer, at least on part with weak supervision 3{3,10,17} of {2,9,16}.

4. The method of claim 1, wherein said target cell has the highest row relevance value within a group of cells located in a column having a highest column correlation value.

5. The method of claim 1, wherein said classifier is a pre-trained transformer-model adapted to execute a next sentence prediction task.

6. The method of claim 1, wherein said classifier is a linear regression model adapted to classify feature vectors.

7. The method of claim 6, further receiving, by said computer, a feature vector representation of said user question, said target table columns, and said target table rows; and
   wherein said column correlation values and row correlation values are generated, at least in part, by said computer, by classifying said feature vector representation.

8. A system to answer a question using a data table, which comprises:
   a computer system comprising a computer readable storage medium having program instructions embodied therewith, the program instructions executable by a computer to cause the computer to:
   receive a user question and a target table containing a target cell corresponding to a target answer for said user question, said target cell corresponding to a target column and a target row;
   generate a first classifier adapted to provide column correlation values reflecting the probability that a given column is said target column;
   generate a second classifier adapted to provide row correlation values reflecting the probability that a given row is said target row;
   apply said first classifier to the columns in the target table to determine a column correlation value for each column;
   apply said second classifier to the rows in the target table to determine a row correlation value for each row;
   suggest as the target cell, a cell having elevated column and row correlation values relative to other cells in the target table;
   receive, by said computer, a set of training data; and
   fine-tune, by said computer using said training data, said first classifier and said second classifier.

9. The system of claim 8, wherein said method further comprises:
   the receiving of the set of training data including a training question, a training table, and identification of a ground truth target answer cell location within said training table, said target cell location corresponding to a target column and a target row;
   the fine-tune of said first classifier to provide column correlation values using said training data; and
   the fine-tune of said second classifier to provide row correlation values using said training data.

10. The system of claim 8, wherein DEP of 2, wherein said fine tuning is conducted, at least on part with weak supervision 3{3,10,17} of {2,9,16}.

11. The system of claim 8, wherein said target cell has the highest row relevance value within a group of cells located in a column having a highest column correlation value.

12. The system of claim 8, wherein said classifier is a pre-trained transformer-model adapted to execute a next sentence prediction task.

13. The system of claim 8, wherein said classifier is a linear regression model adapted to classify feature vectors.

14. The system of claim 13, further receiving a feature vector representation of said user question, said target table columns, and said target table rows; and
   wherein said column correlation values and row correlation values are generated, at least in part, by said computer, by classifying said feature vector representation.

15. A computer program product to answer a question using a data table, the computer program product comprising a computer readable storage medium having program instructions embodied therewith, the program instructions executable by a computer to cause the computer to:
   receive, using said computer, a user question and a target table containing a target cell corresponding to a target answer for said user question, said target cell corresponding to a target column and a target row;
   generate, using said computer, a first classifier adapted to provide column correlation values reflecting the probability that a given column is said target column;
   generate, using said computer, a second classifier adapted to provide row correlation values reflecting the probability that a given row is said target row;
   apply, using said computer, said first classifier to the columns in the target table to determine a column correlation value for each column;
   apply, using said computer, said second classifier to the rows in the target table to determine a row correlation value for each row;
   suggest, using said computer, as the target cell, a cell having elevated column and row correlation values relative to other cells in the target table;
   receive, by said computer, a set of training data; and
   fine-tune, by said computer using said training data, said first classifier and said second classifier.

16. The computer program product of claim 15, wherein said method further comprises:
   the receiving, using said computer, of the set of training data including a training question, a training table, and identification of a ground truth target answer cell location within said training table, said target cell location corresponding to a target column and a target row;
   the fine-tune, using said computer, of said first classifier to provide column correlation values using said training data; and
   the fine-tune, using said computer, of said second classifier to provide row correlation values using said training data.

17. The computer program product of claim 16, wherein said fine tuning is conducted, using said computer, at least on part with weak supervision 3{3,10,17} of {2,9,16}.

18. The computer program product of claim 15, wherein said target cell has the highest row relevance value within a group of cells located in a column having a highest column correlation value.

19. The computer program product of claim 15, wherein said classifier is a pre-trained transformer-model adapted to execute a next sentence prediction task.

20. The computer program product of claim 15, wherein said classifier is a linear regression model adapted to classify feature vectors.

* * * * *